US008509737B2

(12) United States Patent
Cantini et al.

(10) Patent No.: US 8,509,737 B2
(45) Date of Patent: Aug. 13, 2013

(54) SECURITY MODULE AND METHOD OF CONTROLLING USABILITY OF APPLICATION MODULES

(75) Inventors: Renato Cantini, Belfaux (CH); Paul Aebi, Münchringen (CH)

(73) Assignee: Swisscom AG, Bern (CH)

( * ) Notice: Subject to any disclaimer, the term of this patent is extended or adjusted under 35 U.S.C. 154(b) by 1274 days.

(21) Appl. No.: 11/473,016

(22) Filed: Jun. 23, 2006

(65) Prior Publication Data

US 2006/0293030 A1     Dec. 28, 2006

(30) Foreign Application Priority Data

Jun. 23, 2005  (EP) .................................... 05405398

(51) Int. Cl.
    *H04M 1/66*    (2006.01)
(52) U.S. Cl.
    USPC .............. 455/411; 455/410; 380/247; 726/7; 726/19; 726/20
(58) Field of Classification Search
    USPC ............ 455/411, 410; 380/247, 250; 726/7, 726/19, 20
    See application file for complete search history.

(56) References Cited

U.S. PATENT DOCUMENTS

| | | | | |
|---|---|---|---|---|
| 5,864,757 | A * | 1/1999 | Parker ........................... | 455/418 |
| 5,950,126 | A * | 9/1999 | Palviainen et al. ........... | 455/423 |
| 6,226,749 | B1 | 5/2001 | Carloganu et al. | |
| 6,367,014 | B1 * | 4/2002 | Proust et al. .................. | 713/182 |
| 6,393,270 | B1 * | 5/2002 | Austin et al. .................. | 455/411 |
| 6,550,010 | B1 | 4/2003 | Link, II et al. | |
| 6,591,116 | B1 * | 7/2003 | Laurila et al. ................. | 455/558 |
| 7,197,340 | B2 * | 3/2007 | Bahr et al. ................... | 455/569.1 |
| 7,263,348 | B2 * | 8/2007 | Matsumoto ................... | 455/410 |
| 7,302,272 | B2 * | 11/2007 | Ackley .......................... | 455/466 |
| 7,536,173 | B1 * | 5/2009 | Link et al. ..................... | 455/411 |
| 2002/0004785 | A1 * | 1/2002 | Schull ............................ | 705/51 |
| 2004/0097271 | A1 * | 5/2004 | Aerrabotu ..................... | 455/565 |
| 2004/0123152 | A1 | 6/2004 | Le Saint | |
| 2004/0142686 | A1 * | 7/2004 | Kirkup et al. ................. | 455/420 |
| 2004/0147251 | A1 * | 7/2004 | Nakayama et al. ........ | 455/414.2 |
| 2004/0260791 | A1 | 12/2004 | Jerbi et al. | |
| 2005/0037732 | A1 * | 2/2005 | Kotzin .......................... | 455/411 |
| 2006/0273161 | A1 * | 12/2006 | Little et al. ................... | 235/382 |
| 2007/0143824 | A1 * | 6/2007 | Shahbazi ......................... | 726/1 |

FOREIGN PATENT DOCUMENTS

EP            1 271 881 A      1/2003

* cited by examiner

*Primary Examiner* — Allahyar Kasraian
(74) *Attorney, Agent, or Firm* — McAndrews, Held & Malloy, Ltd.

(57) ABSTRACT

For a communication terminal (10), proposed is a security module (1) configured to authenticate a telecommunications network (2). The security module (1) comprises a locking module (12), for disabling usability of an application module (11), an unlocking module (13), for re-enabling usability of the application module (11), and a control module (14) for activating the unlocking module (13), depending on received data that is assignable in an authenticated way to a specific telecommunications network (2). The control module (14) is configured to activate the locking module (12) depending on the selection and usage of the application module (11). The control module (14) is configured to activate the unlocking module (12) depending on the reception of authorization messages, that can be authenticated, or authentication data of the telecommunications network (2). By disabling and re-enabling usability of the application module (11), depending on received data that is assignable in an authenticated way to a specific telecommunications network (2), the usage of network independent applications can be tied to the usage of a specific telecommunications network.

21 Claims, 4 Drawing Sheets

SECURITY MODULE AND METHOD OF CONTROLLING USABILITY OF APPLICATION MODULES

FIELD OF THE INVENTION

The present invention relates to a security module and a method of controlling the usability of application modules. Specifically, the present invention relates to a security module suitable for a communication terminal, the security module being configured to authenticate a telecommunications network and comprising at least one usable application module, as well as a method of controlling the usability of the application module.

BACKGROUND OF THE INVENTION

Security modules are known particularly for mobile communication terminals, for example mobile radio telephones, in the form of chip cards as so called SIM cards (Subscriber Identity Module). Such security modules are being used more and more in communication terminals for fixed networks. In addition to subscriber identification, the security modules provide also for authentication of telecommunications networks. In various standards, described are protocols for end-to-end network authentication by the security module. For example, in the technical specifications ETSI TS 133 102 V6.3.0 (2004-12); Universal Mobile Telecommunications System (UMTS); 3G Security; Security Architecture (3GPP TS 33.102 Version 6.3.0 Release 6) or ETSI TS 131 102 V6.9.0 (2005-03) Universal Mobile Telecommunications System (UMTS); Characteristics of the USIM Application (3GPP TS 31.102 Version 6.9.0 Release 6), defined is the authentication of network access to mobile radio networks based on 3GPP AKA (3GPP: Third Generation Partnership Project; AKA: Authentication and Key Agreement Protocol). For example, in the technical specifications ETSI TS 131 103 V6.7.0 (2005-03); Digital Cellular Telecommunications System (Phase 2+); Universal Mobile Telecommunications System (UMTS); Characteristics of the IP Multimedia Services Identity Module (ISIM) Application (3GPP TS 31.103 Version 6.7.0 Release 6), defined is the authentication of access to IMS (IP Multimedia Subsystem) based on 3GPP AKA. For example, in ETSI TS 102 310 V6.1.0 (2005-02); Smart Cards; Extensible Authentication Protocol Support in the UICC (Release 6), described is the authentication of access to public wireless local area networks (WLAN) based on EAP (Extensible Authentication Protocol). In ETSI TS 101 181 V8.8.0 (2001-12); Digital Cellular Telecommunications System (Phase 2+); Security Mechanisms for SIM Application Toolkit; Stage 2 (3GPP TS 03.48 Version 8.8.0 Release 1999) and ETSI TS 123 048 V5.8.0 (2003-12); Digital Cellular Telecommunications system (Phase 2+); Universal Mobile Telecommunications System (UMTS); Security Mechanisms for the (U)SIM Application Toolkit; Stage 2 (3GPP TS 23.048 Version 5.8.0 Release 5), further authentication mechanisms are described for SMS (Short Messaging Services). Typically, the security modules comprise also application modules, which are often usable network independently. For example, a cryptography module for decrypting encrypted data can be used, without the need to access an authenticated telecommunications network. Similarly, an application module for online payment via the Internet can be used without having to use necessarily the mobile radio network or WLAN operated by the issuer of the security module. To an operator of a telecommunications network, particularly a mobile radio network or WLAN, who provides to a subscriber, for use in the telecommunications network, a security module with application modules, the security module does not provide any control whether or not the subscriber uses network independent application modules without using also the telecommunications network of the operator. This means that the security module does not provide for tying the usage of the network independent applications to the usage of the operator's telecommunications network.

SUMMARY OF THE INVENTION

It is an object of the present invention to provide a security module suitable for a communication terminal, as well as a method of controlling the usability of an application module of the security module, which security module and method do not have the disadvantages of the prior art. In particular, it is an object of the present invention to provide a security module as well as a method of controlling the usability of an application module of the security module, which security module and method make is possible to tie at least to a certain degree the usage of the network independent application modules to the usage of a specific telecommunications network.

It shall be stated here that the term "usability" means the characteristics or state of an application module to be available for use (by a user). Correspondingly, an application module with disabled usability is not available for use (by the user), for example, because the application module is not visible to the user, selectable or executable by the user, or cannot be activated by the user.

According to the present invention, the above-mentioned objects are achieved particularly through the features of the independent claims. In addition, further advantageous embodiments follow from the dependent claims and the description.

The security module is provided for a communication terminal and comprises at least one usable application module. Moreover, the security module is configured to authenticate a telecommunications network.

According to the present invention, the above-mentioned objects are particularly achieved in that the security module is provided with a locking module for disabling the usability of the application module. Furthermore, the security module comprises an unlocking module, for re-enabling (or enabling, respectively) the usability of the application module, as well as a control module, for activating the unlocking module (or activating the re-enablement of the usability, respectively) depending on received data, the data being assignable in an authenticated way to a specific telecommunications network. For example, the security module comprises multiple control modules, each assigned to an application module. Preferably, the security module is implemented as a device, particularly as a chip card connectable in a removable way to the communication terminal. One skilled in the art will understand that, in an embodiment, the security module can be implemented as a computer program product comprising computer program code means for controlling one or more processors of the communication terminal. In an embodiment, the security module is implemented as a subscriber identification module. For example, the security module is implemented for a mobile communication terminal configured for mobile radio networks. By disabling and re-enabling the usability of the application module, depending on received data that is assignable in an authenticated way to a specific telecommunications network, the usage of network independent applications can be tied to the usage of a specific telecommunications network. For example, the usability of an application module can be tied to the condition that the user of the communication terminal registers in the specific telecommunications network and thereby receives authentication data of this telecommunications network. Preferably, the condition for usability is extended to telecommunications network having a roaming agreement with the specific telecommunications network, i.e. the usability is consequently tied to the usage of telecommunications networks of the home network operator and the roaming partner of the home network operator. Through explicit transmission of authorization messages or authorization data, respectively, that can be authenticated, the usability of an application module can be tied to certain conditions of the operator of the telecommunications network, for example, to a certain number of services drawn by the user from the operator of the telecommunications network.

In different or combined embodiments, the control module is further configured to activate the blocking module depending on the number of times the application module is used, the number of times the application module is selected, the number of times functions of the application module are used, the number of sessions through a logical channel of the application module, the number of reset cycles of the security module, and/or the reaching of a time period. By watching different parameters, it is possible to control dynamically the usability of an application module and to adapt flexibly the usability of an application module to different requirements.

In different or combined embodiments, the control module is further configured to activate the unblocking module depending on received authorization messages, which messages can be authenticated and are assignable to the specific telecommunications network, and/or depending on received authentication data, which data is assignable to the specific telecommunications network. Controlling the usability of an application module depending on received authentication data has the advantage that the usability can be controlled solely in the security module, without further changes of the network infrastructure.

In different or combined embodiments, the blocking module is configured to disable the usability of the application module by deactivating, locking, hiding, hibernating, and/or de-installing the application module. Correspondingly, the unlocking module is configured to re-enable the usability of the application module by activating, unlocking, listing, waking up, and/or installing the application module.

In an embodiment, the security module comprises at least one expiry register, assigned to one or more application modules. The control module is configured to store in the expiry register current data about the number of times the application module is used, the number of times the application module is selected, the number of times functions of the application module are used, the number of sessions through a logical channel of the application module, the number of reset cycles of the security module, and/or the time period.

In an embodiment, the security module comprises at least one authorization register, assigned to one or more application modules. The control module is configured to store in the authorization register current data about the authorized number of times the application module may be used, the authorized number of times the application module may be selected, the authorized number of times functions of the application module may be used, the authorized number of sessions through a logical channel of the application module, the authorized number of reset cycles of the security module, and/or the authorized time period.

In addition to the security module for communication terminals and the method for controlling the usability of an application module, the present invention also relates to a computer program product including computer program code means for controlling one or more processors of a security module, which security module is configured to authenticate a telecommunications network and comprises at least one usable application module. Particularly, a computer program product including a computer readable medium having stored therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
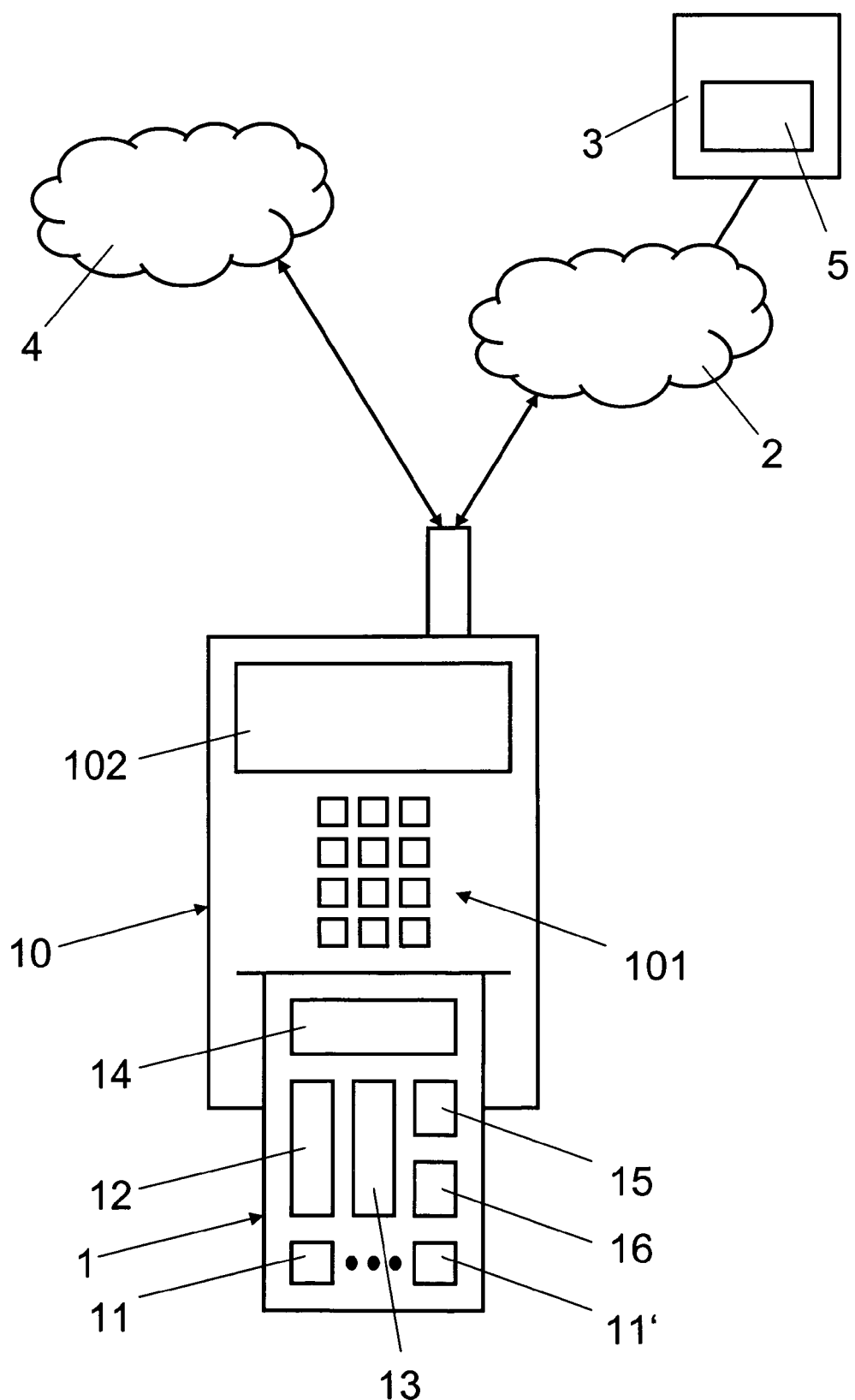
FIG. 1 shows a block diagram representing schematically a communication terminal with a security module, the security module being implemented as a device that is connected removably to the communication terminal.
Figure 2:
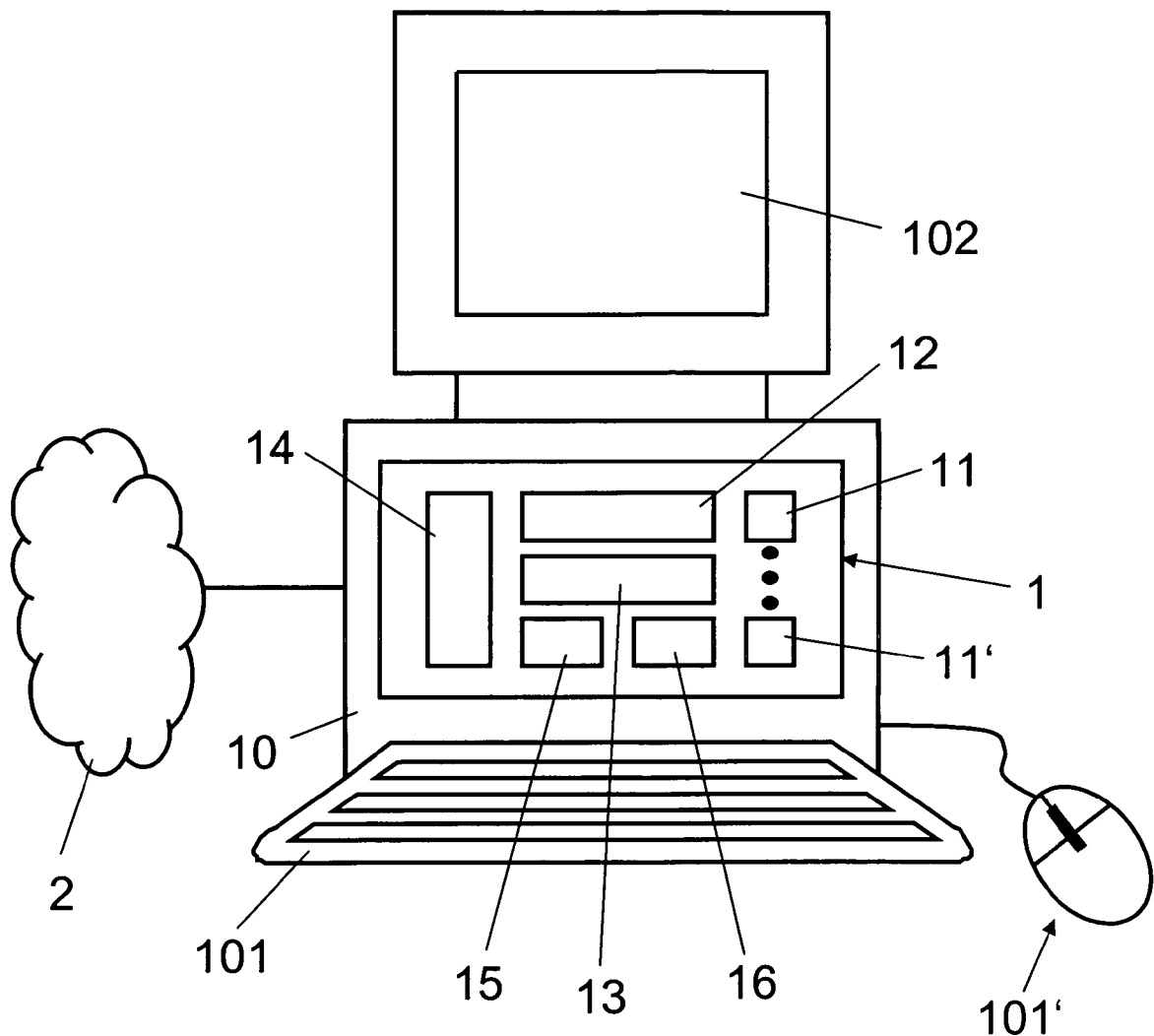
FIG. 2 shows a block diagram representing schematically a further example of a communication terminal with a security module, the security module being implemented as a computer program product having computer program means for controlling one or more processors of the communication terminal.

In FIGS. 1 to 6, corresponding components are each designated with the same reference numeral.

In FIGS. 1 to 6, reference numeral 1 refers to a security module configured to authenticate a telecommunications network 2. For example, the security module 1 performs an end-to-end authentication of the telecommunications network 2 based on the known authentication mechanisms quoted in the introduction. The security module 1 comprises multiple application modules 11, 11', usable by the user of the security module 1, or by the run time environment (client execution environment) or applications of the communication terminal 10. For application modules 11, 11' requiring user interaction, the user can enter data, for example via data entry elements 101, 101' (keyboard, mouse), and data can be provided to the user acoustically or via display 102. In addition to the usable application modules 11, 11', the security module 1 comprises further functional modules, particularly a locking module 12, an unlocking module 13, and a control module 14, as well as an expiry register 15 and an authorization register 16. The locking module 12 is configured to disable the usability of one or more application modules 11, 11', i.e. to block availability and/or authorization for using the respective application module 11, 11'. The unlocking module is configured to re-enable the usability of one or more application modules 11, 11', i.e. to establish (for a first time) or re-establish (anew) availability and/or authorization for using the respective application module 11, 11'. The control module 14 is configured to activate the unlocking module 13, or the re-enablement and re-establishment of the usability, respectively, as well as the locking module 12, or the disablement of the usability, respectively, depending on the usage of one or more application modules 11, 11', i.e. depending on defined conditions on usage of the application modules 11, 11'. Preferably, the functional modules are implemented as programmed software modules. The functional modules comprise computer program code for controlling one or more processors, located on the device where the security module 1 is implemented. As depicted schematically in FIG. 1, the security module 1 is preferably implemented as a device connected removably to communication terminal 10, preferably as a chip card, particularly as a subscriber identification module in the form of a SIM card. As depicted schematically in FIG. 2, in an embodiment, the security module 1 is implemented directly in the communication terminal 10 as a computer program product, controlling one or more processors of the communication terminal 10. One skilled in the art will understand that the functional modules can be implemented fully or partly by means of hardware. The communication terminal 10 comprises at least a communication module for data communication via telecommunication networks 2, 4. For example, the communication terminal 10 is implemented as a mobile radio telephone, personal data assistant (PDA), laptop, or personal computer. Preferably, telecommunication network 2 comprises a mobile radio network, for example a GSM network (Global System for Mobile Communication), a UMTS network (Universal Mobile Telephone System), another, e.g. satellite based, mobile radio network, and/or a (public) WLAN. One skilled in the art will understand that telecommunications network 2 can also include a fixed network, for example an ISDN (Integrated Services Digital Network) or the Internet. Telecommunications network 4 corresponds technologically to telecommunications network 2, for example. However, telecommunications network 4 has a different network identifier (e.g. a different Mobile Network Code, MNC) and is typically operated by a different operator. In FIG. 1, reference numeral 3 refers to a central authentication unit, supporting end-to-end network authentication on the network side. Reference numeral 5 refers to an authorization control module which does not have to be implemented in the central authentication unit 3, but can be arranged in another network unit of telecommunications network 2, for example in an authorization control server. Preferably, authorization control module 5 is implemented as a computer program product comprising computer program code for controlling one or more processors of a network unit of telecommunications network 2. The authorization control module 5 will be described later.

In the following paragraphs, the functionality of security module 1 will be described with reference to FIGS. 3 to 6. In FIGS. 3 to 6, reference numerals 7, 7' refer to application modules (client applications) of communication terminal 10; reference numeral 8 refers to the run time environment (client execution environment) of the communication terminal 10; reference numeral 9 refers to an event control module (client event handler) of the communication terminal 10; reference numeral 6 refers to a network gateway; and reference numeral 17 refers to run time environment (execution environment) of the security module 1. FIGS. 3 to 6 provide a logical/functional representation. In FIGS. 3 to 6, indicated by step S7 are the data flow and control flow on the application level between an active application module 11 of the security module 1 and an associated application module 7 of the communication terminal 10. Step S7' indicates schematically that events, such as the selection of an application (e.g. application module 11 of the security module 1), are triggered by application module 7 of the communication terminal 10.

As shown in FIGS. 3 to 6, in step S1', data is received in the run time environment 17 of the security module 1 from the central authentication unit 3 or from authorization control module 5. For example, in step S1, the data is routed through gateway 6. The data from the central authentication unit 3 comprises authentication data, which data is transmitted to the security module 1 when the telecommunications network 2 is authenticated and which data indicates an authentication of the telecommunications network 2. The data from the authorization control module 5 comprise at least an authorization message, transmitted by the authorization control module 5 to the security module 1. The authorization message can be authenticated and assigned to telecommunications network 2, or authorization control module 5, an associated authorization control server or a trusted service provider, respectively. The authorization message comprises, for example, authorization data including instructions for enabling or re-enabling authorization to use one or more application modules 11, 11'. It is also possible to generate implicitly in the security module 1 authorization data based on a received authorization message. In the run time environment 17 of the security module 1, time stamps that can be authenticated can be received from a trusted time server via telecommunications network 2, 4. Moreover, in step S2', data is received in the run time environment 17 of the security module 1 from the run time environment 8 of the communication terminal 10. For example, in step S2, the data is routed through the event control module 9 of the communication terminal 10. The data from the run time environment 8 comprises instructions for selecting and activating application modules 11, 11', for selecting and activating functions of application modules 11, 11', as well as for resetting the security module 1.

Figure 3:
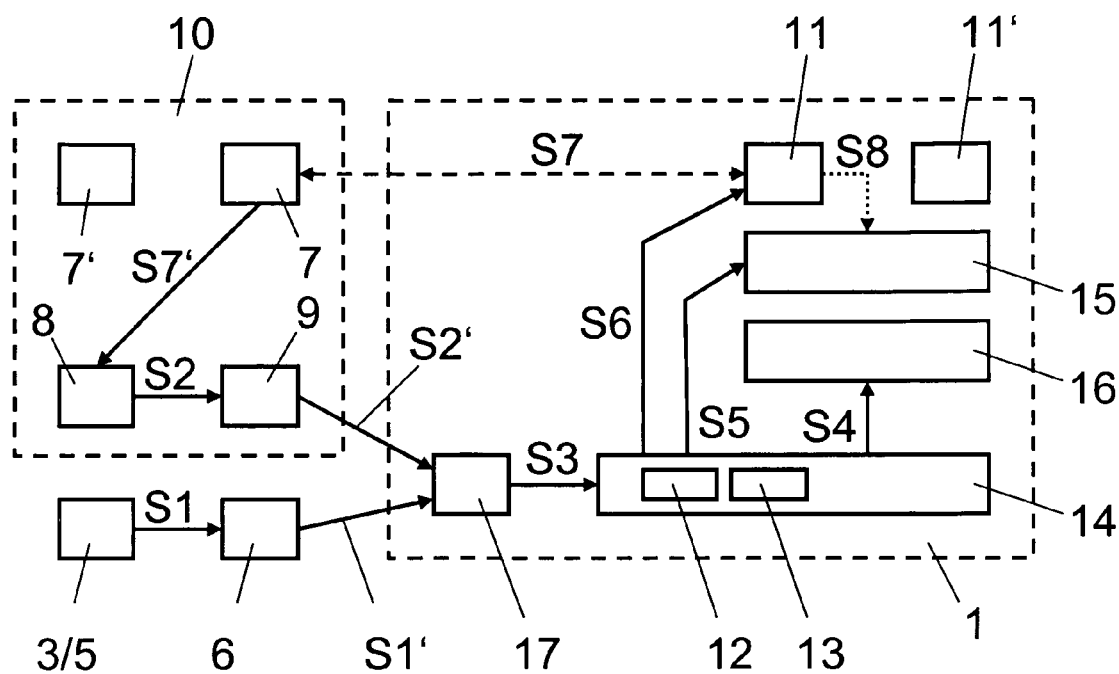
FIG. 3 shows a block diagram illustrating schematically a possible embodiment of the security module and respective process flows.
Figure 4:
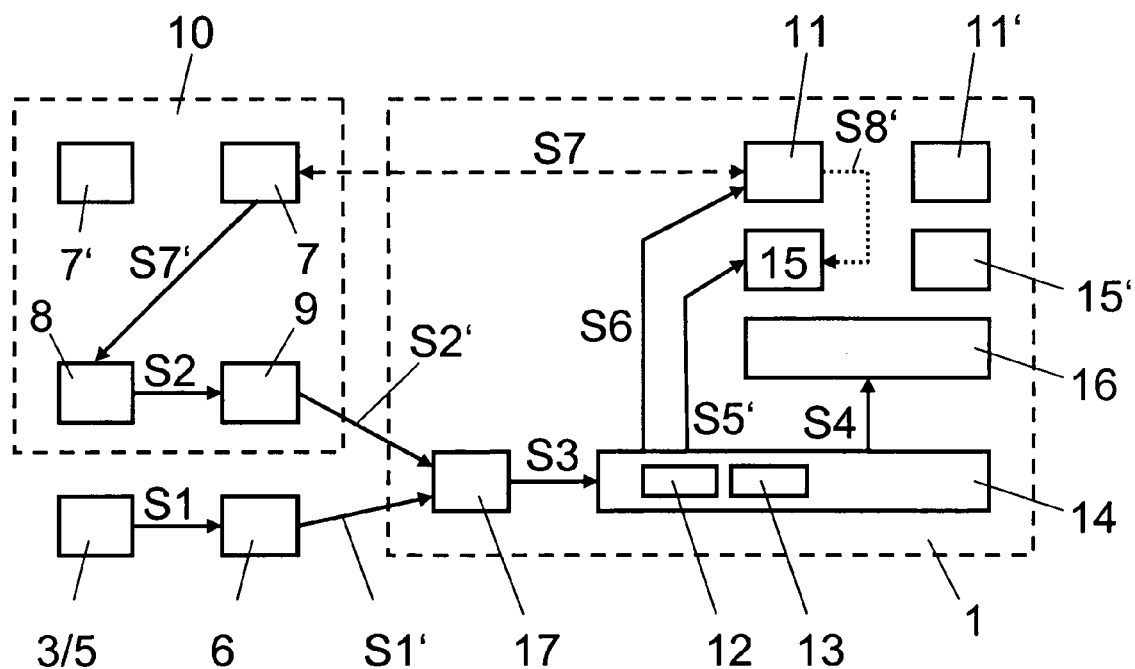
FIG. 4 shows a block diagram illustrating schematically a further possible embodiment of the security module and respective process flows.
Figure 5:
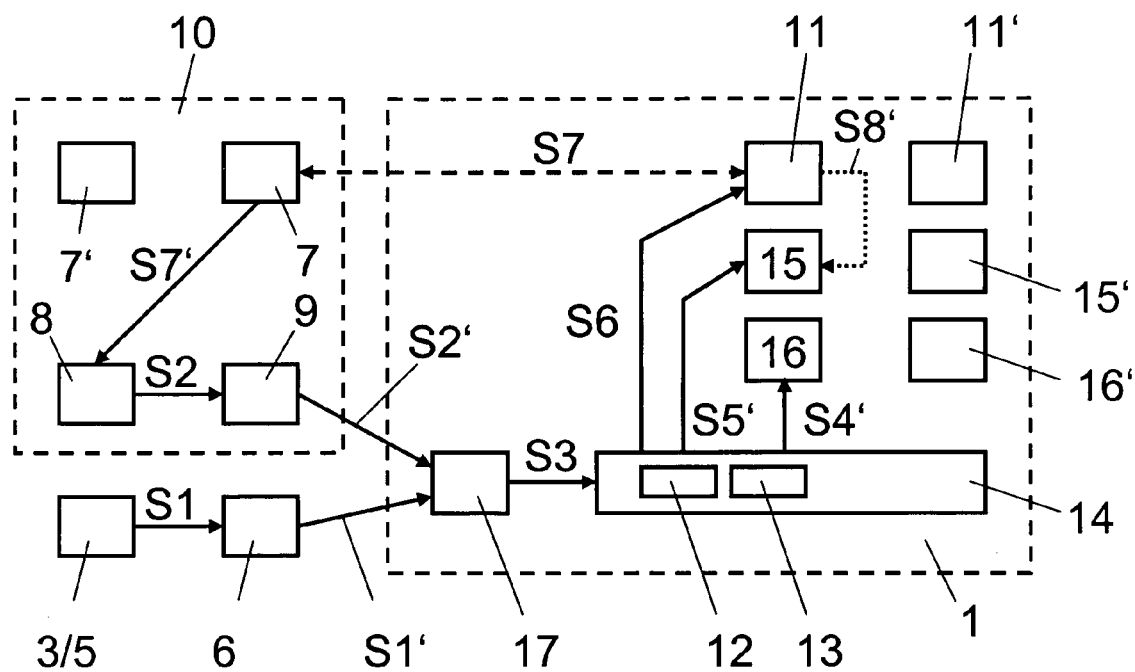
FIG. 5 shows a block diagram illustrating schematically still a further possible embodiment of the security module and respective process flows.

As shown in FIGS. 3 to 5, in step S3, the run time environment 17 of the security module 1 forwards the received data to the control module 14.

Figure 6:
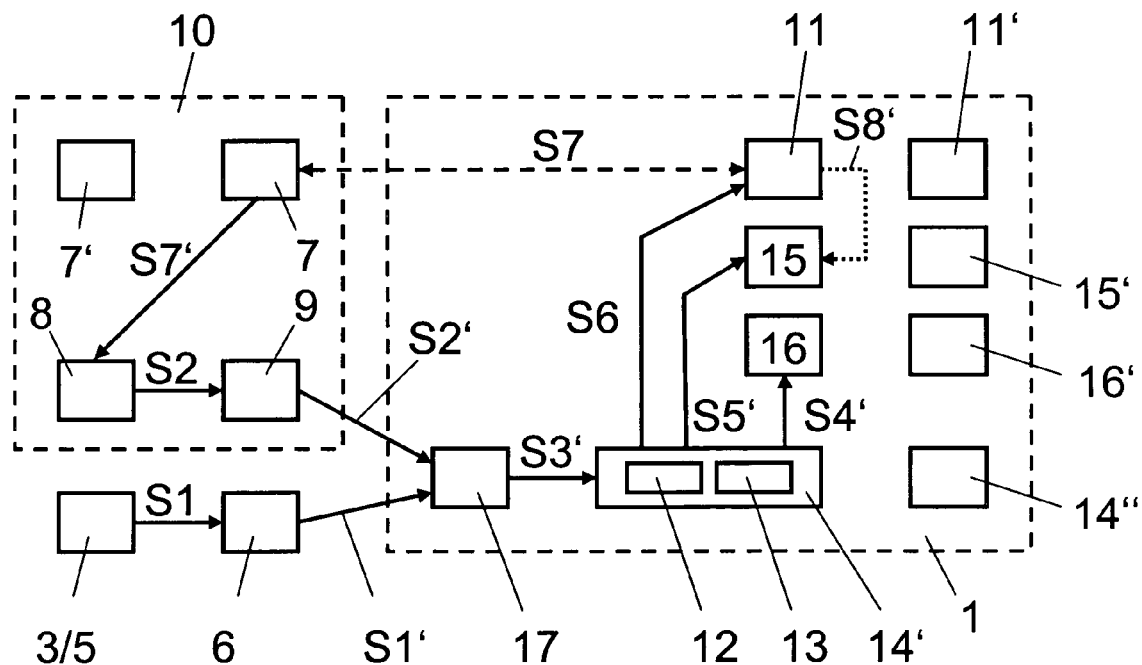
FIG. 6 shows a block diagram illustrating schematically a further possible embodiment of the security module and respective process flows.

As shown in FIG. 6, in an embodiment, the security module 1 has multiple control modules 14', 14", each assigned to one of the application modules 11, 11'. In the embodiment according to FIG. 6, in step S3', data from the run time environment 8, concerning the control of one of the application modules 11, 11', is forwarded to the respective control module 14', 14". Furthermore, in the embodiment according to FIG. 6, in step S3', authorization messages for one or more defined application modules are each forwarded to the respective control module 14', 14".

As shown in FIGS. 3 and 4, in step S4, the control module 14 updates the authorization register 16 based on received authorization messages or authentication data, indicating an authentication of the telecommunications network 2. Based on the received authorization messages or authentication data, control module 14 activates the unlocking module 13. In step S6, the unlocking module 13 enables or re-enables the usability of one or more or all application modules 11, 11'. Enabling or re-enabling the usability of an application module 11, 11', respectively, is achieved by the unlocking module 13 activating, unblocking, waking up, installing, or showing in a list the respective application module 11, 11'. It is also possible to delete a locking token that is being read by the application module 11, 11'. The authorization register 16 comprises authorization conditions for one or more specific application modules 11, 11' or for all application modules 11, 11' of the security module 1. For one or more application modules 11, 11', the authorization conditions comprise, for example, the authorized number of times the application module 11, 11' can be used, the authorized number of times the application module 11, 11' can be selected, the authorized number of times functions of the application module 11, 11' can be used, the authorized number of sessions through a logical channel of the application module 11, 11', the authorized number of reset cycles of the security module, and/or the authorized time period the application module 11, 11' can be used. For example, the authorization conditions are set in the authorization register 16 based on the received re-enablement instructions or authentication data, the authorization data being contained in the re-enablement instructions or stored hidden in the security module 1.

In an embodiment, enablement or re-enablement of the usability of an application module, based on received authentication data, is tied to additional conditions, specifying a defined number of authentications of the telecommunications network 2 within a defined time period, for example.

As shown in FIGS. 5 and 6, in an embodiment, the security module 1 has multiple authorization registers 16, 16', each being assigned to one of the application modules 11, 11'. In the embodiment according to FIGS. 5 and 6, in step S4', the control module 14 (or 14', 14", respectively) updates the respective authorization register 16, 16' based on the received authorization messages or authentication data.

The security module 1 has one or more expiry registers 15, 15' for tracking and updating changing authorizations. FIG. 3 illustrates an embodiment where the security module 1 has an expiry register 15. FIGS. 4 to 6 illustrate preferred embodiments where the security module 1 has multiple expiry registers 15, 15', each being assigned to one of the application modules 11, 11'. In the expiry register 15, 15', data is stored about activities executed or yet to be executed in connection with one or more application modules 11, 11'. If the expiry register 15, 15' is configured as an incrementing register, time values or number of activities (usages) are incremented starting at zero. If the expiry register 15, 15' is configured as a decrementing register, time values or number of activities (usages) are decremented starting from an initial limit (authorization conditions). Particularly, the expiry register 15, 15' comprises data about the number of times the application module 11, 11' has been used, the number of times the application module 11, 11' has been selected, the number of times functions of the application module 11, 11' have been used, the number of established sessions through a logical channel of the application module 11, 11', the number of reset cycles of the security module 1, and a time period, for example the time period from the time the authorization was granted. One skilled in the art will understand that the expiry register 15, 15' can correspond to the authorization register 16, 16', whereby setting the authorization register 16, 16' corresponds to setting an initial value in the expiry register 15, 15', the initial value being decremented over time or depending on the usage.

If the received data comprise a request, regarding one of the application modules 11, 11', or a reset request, in step S5, S5', the control module 14, 14' updates the respective expiry register 15, 15' and checks the authorization for selecting or activating the respective application module 11, 11' or respective function of the application module 11, 11'. Checking the authorization is based on the respective authorization register 16, 16' and/or expiry register 15, 15'. In the case of the incrementing expiry register 15, 15', there is no longer an authorization, when the incremented value exceeds or reaches the corresponding maximum allowable value (e.g. the number of usages) in the authorization register 16, 16'. In the case of the decrementing expiry register 15, 15', there is no longer an authorization, when the decremented value starting from the maximum allowable value (e.g. the number of selections) in the authorization register 16, 16' reaches a value of zero. If there is no authorization, for example, an error reply message is generated for the requesting unit. If the authorization expires because of the present request, the control module 14 activates the locking module 12, which disables the usability of one, more, or all the application modules 11, 11'. Disabling the usability of an application module 11, 11' is achieved by the locking module 12 deactivating, blocking, hibernating, de-installing, or hiding (through removal from a list) the respective application module 11, 11'. It is also possible to set a locking token which is being read during activation by the application module 11, 11', whereby the activation module 11, 11' terminates its activity upon reading a locking token. Otherwise, if there is an authorization, the respective application module 11, 11' or the respective function is selected and activated. In an alternative embodiment, as indicated in FIG. 3, in step S8, the expiry register 15 is updated by the respective application module 11. In the embodiments with multiple expiry registers 15, 15', as indicated in FIGS. 4 to 6, in step S8', updated is the expiry register 15 assigned to the respective application module 11, 11'.

In the security module 1, for application modules 11, 11' of different telecommunications networks 2 or operators, respectively, different expiry registers 15, 15' and authorization registers 16, 16' can be provided.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in the description, the computer program code has been associated with specific software modules, one skilled in the art will understand, however, that the computer program code may be structured differently, without deviating from the scope of the invention. Furthermore, the particular order of the steps set forth in the specification should not be construed as limitations on the claims.

What is claimed is:

1. A security module for a communication terminal, the security module being configured to perform end-to-end authentication of a plurality of telecommunications networks and comprising:

one or more usable application modules;

a locking module for selectively disabling usability of one or more of the application modules;

an unlocking module for selectively re-enabling usability of one or more of the application modules;

at least one authorization register, assigned to one or more application modules; and a control module for tying selective usability of one or more of the application modules to usage of a specific telecommunications network operated by a specific operator among the plurality of telecommunication networks by activating the unlocking module depending on:

authentication data received in the security module, when the communication terminal is registered in the specific telecommunications network, from a central authentication unit supporting end-to-end authentication of the specific telecommunications network, which authentication data is assignable in an authenticated way to the specific telecommunications network and indicates an authentication of the specific telecommunications network;

and wherein the control module is configured to store in the authorization register current data about at least one of: an authorized number of sessions through a logical channel of the application module and an authorized number of reset cycles of the security module.

2. The security module of claim 1, wherein the control module is further configured to activate the locking module depending on at least one of: number of times the application module is used, number of times the application module is selected, number of times functions of the application module are used, number of sessions through a logical channel of the application module, number of reset cycles of the security module, and a time period.

3. The security module of claim 1, wherein the locking module is configured to disable the selective usability of one or more of the application modules by one of: deactivating, locking, hiding, hibernating, and de-installing the application module, and wherein the unlocking module is configured to re-enable correspondingly the usability of the application module by one of: activating, unlocking, listing, waking up, and installing the application module.

4. The security module of claim 1, wherein the security module further comprises at least one expiry register, assigned to one or more application modules; and wherein the control module is configured to store in the expiry register current data about at least one of: number of times the application module is used, number of times the application module is selected, number of times functions of the application module are used, number of sessions through a logical channel of the application module, number of reset cycles of the security module, and a time period.

5. The security module of claim 1, wherein the control module is further configured to store in the authorization register current data about at least one of: authorized number of times the application module may be used, and an authorized time period.

6. The security module of claim 1, wherein the security module is implemented as a device, or as a chip card connectable in a removable way to the communication terminal.

7. The security module of claim 1, wherein the security module is implemented as a computer program product comprising computer program code means for controlling one or more processors of the communication terminal.

8. The security module of claim 1, wherein the security module is implemented as a subscriber identification module for a mobile communication terminal configured for mobile radio networks.

9. The security module of claim 1, wherein the plurality of telecommunications networks include a home network of the communication terminal and other communication networks having a roaming agreement with the home network.

10. A non-transitory computer readable medium which comprises computer program code means for controlling one or more processors of a security module for communication terminals, the security module being configured to perform end-to-end authentication of a plurality of telecommunications networks and including one or more usable application modules and at least one authorization register, assigned to one or more application modules, such that the security module:

performs a selective disablement of usability of one or more of the application modules;

performs a selective re-enablement of usability of one or more of the application modules; and ties selective usability of one or more of the application modules to a usage of a specific telecommunications network operated by a specific operator among the plurality of telecommunication networks by activating the re-enablement of usability of the application module depending on:

authentication data received in the security module, when the communication terminal is registered in the specific telecommunications network, from a central authentication unit supporting end-to-end authentication of the specific telecommunications network, which authentication data is assignable in an authenticated way to the specific telecommunications network and indicates an authentication of the specific telecommunications network;

wherein the control module stores in the authorization register current data about at least one of: an authorized number of sessions through a logical channel of the application module and an authorized number of reset cycles of the security module.

11. The non-transitory computer readable medium of claim 10, wherein the plurality of telecommunications networks include a home network of the communication terminal and other communication networks having a roaming agreement with the home network.

12. A method of controlling usability of one or more application modules, the application module being implemented in a security module for a communication terminal, wherein the security module comprises at least one authorization register, assigned to one or more application modules, the security module being configured to perform end-to-end authentication of a plurality of telecommunications networks, the method comprising:

selectively disabling, by a locking module of the security module, usability of one or more of the application modules;

selectively re-enabling, by an unlocking module of the security module, usability of one or more of the application modules;

storing in the authorization register, by the control module, current data about at least one of: an authorized number of sessions through a logical channel of the application module and an authorized number of reset cycles of the security module; and tying, by a control module of the security module, selective usability of one or more of the application modules to a usage of a specific telecommunications network operated by a specific operator among the plurality of telecommunication networks by activating the re-enabling of usability of the application module depending on:

authentication data received in the security module, when the communication terminal is registered in the specific telecommunications network, from a central authentication unit supporting end-to-end authentication of the specific telecommunications network, which authentication data is assignable in an authenticated way to the specific telecommunications network and indicates an authentication of the specific telecommunications network.

13. The method of claim 12, wherein disabling usability of the application module is activated depending on at least one of: number of times the application module is used, number of times the application module is selected, number of times functions of the application module are used, number of sessions through a logical channel of the application module, number of reset cycles of the security module, and a time period.

14. The method of claim 12, wherein re-enabling usability of the application module is activated depending on one of: a received authorization message, which message is assignable in an authenticated way to the specific telecommunications network, and received authentication data, which data is assignable to the specific telecommunications network.

15. The method of claim 12, wherein the plurality of telecommunications networks include a home network of the communication terminal and other communication networks having a roaming agreement with the home network.

16. A security module for a communication terminal, the security module being configured to perform end-to-end authentication of a plurality of telecommunications networks and comprising:
    at least one usable application module;
    at least one authorization register, assigned to one or more application modules;
    a locking module for disabling usability of the application module;
    a control module for tying usability of the application module to usage of a specific telecommunications network operated by a specific operator among the plurality of telecommunication networks by activating the unlocking module depending on:
        authentication data received in the security module, when the communication terminal is registered in the specific telecommunications network, from a central authentication unit supporting end-to-end authentication of the specific telecommunications network, which authentication data is assignable in an authenticated way to the specific telecommunications network and indicates an authentication of the specific telecommunications network, and
        a defined number of authentications of the specific telecommunications network within a defined time period;
    and wherein the control module is configured to store in the authorization register current data about at least one of: an authorized number of sessions through a logical channel of the application module and an authorized number of reset cycles of the security module.

17. The security module of claim 16, wherein the plurality of telecommunications networks include a home network of the communication terminal and other communication networks having a roaming agreement with the home network.

18. A non-transitory computer readable medium which comprises computer program code means for controlling one or more processors of a security module for communication terminals, the security module being configured to perform end-to-end authentication of a plurality of telecommunications networks and including at least one usable application module and at least one authorization register, assigned to one or more application modules, such that the security module:
    performs a disablement of usability of the application module;
    performs a re-enablement of usability of the application module; and
    ties usability of the application module to a usage of a specific telecommunications network operated by a specific operator among the plurality of telecommunication networks by activating the re-enablement of usability of the application module depending on:
        authentication data received in the security module, when the communication terminal is registered in the specific telecommunications network, from a central authentication unit supporting end-to-end authentication of the specific telecommunications network, which authentication data is assignable in an authenticated way to the specific telecommunications network and indicates an authentication of the specific telecommunications network, and
        a defined number of authentications of the specific telecommunications network within a defined time period;
    wherein the control module stores in the authorization register current data about at least one of: an authorized number of sessions through a logical channel of the application module and an authorized number of reset cycles of the security module.

19. The non-transitory computer readable medium of claim 18, wherein the plurality of telecommunications networks include a home network of the communication terminal and other communication networks having a roaming agreement with the home network.

20. A method of controlling usability of an application module, the application module being implemented in a security module for a communication terminal, wherein the security module comprises at least one authorization register, assigned to one or more application modules, the security module being configured to perform end-to-end authentication of a plurality of telecommunications networks, the method comprising:
    disabling, by a locking module of the security module, usability of the application module;
    re-enabling, by an unlocking module of the security module, usability of the application module; and
    tying, by a control module of the security module, usability of the application module to a usage of a specific telecommunications network operated by a specific operator among the plurality of telecommunication networks by activating the re-enabling of usability of the application module depending on:
        authentication data received in the security module, when the communication terminal is registered in the specific telecommunications network, from a central authentication unit supporting end-to-end authentication of the specific telecommunications network, which authentication data is assignable in an authenticated way to the specific telecommunications network and indicates an authentication of the specific telecommunications network, and
        a defined number of authentications of the specific telecommunications network within a defined time period;
    and wherein the control module stores in the authorization register current data about at least one of: an authorized number of sessions through a logical channel of the application module and an authorized number of reset cycles of the security module.

21. The method of claim 20, wherein the plurality of telecommunications networks include a home network of the communication terminal and other communication networks having a roaming agreement with the home network.

* * * * *

UNITED STATES PATENT AND TRADEMARK OFFICE
CERTIFICATE OF CORRECTION

| | | |
|---|---|---|
| PATENT NO. | : 8,509,737 B2 | Page 1 of 1 |
| APPLICATION NO. | : 11/473016 | |
| DATED | : August 13, 2013 | |
| INVENTOR(S) | : Cantini et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1385 days.

Signed and Sealed this
Seventeenth Day of February, 2015

Michelle K. Lee
*Deputy Director of the United States Patent and Trademark Office*